United States Patent [19]

Topouzian

[11] 4,169,919
[45] Oct. 2, 1979

[54] DOUBLE SEAL FOR SODIUM SULFUR BATTERY

[75] Inventor: Armenag Topouzian, Birmingham, Mich.

[73] Assignee: Ford Motor Company, Dearborn, Mich.

[21] Appl. No.: 954,966

[22] Filed: Oct. 26, 1978

[51] Int. Cl.² ............................................. H01M 2/00
[52] U.S. Cl. .................................. 429/104; 429/174; 429/185
[58] Field of Search ....................... 429/104, 101–103, 429/171, 172, 174, 185, 191, 31, 163, 164

[56] References Cited

U.S. PATENT DOCUMENTS

| 3,928,071 | 12/1975 | Thornton | 429/104 X |
| 3,939,007 | 2/1976 | Sudworth et al. | 429/104 X |
| 3,959,013 | 5/1976 | Breiter | 429/104 X |
| 4,024,321 | 5/1977 | Tilley | 429/104 |
| 4,048,391 | 9/1977 | Tilley et al. | 429/104 |
| 4,049,889 | 9/1977 | Heintz | 429/174 |
| 4,104,448 | 8/1978 | Gibson et al. | 429/104 X |
| 4,110,516 | 8/1978 | Breiter | 429/104 |

Primary Examiner—Anthony Skapars
Attorney, Agent, or Firm—William E. Johnson; Keith L. Zerschling

[57] ABSTRACT

This invention is directed to a seal for a sodium sulfur battery in which the sealing is accomplished by two radial compression seals located one above the other on a ceramic component of the battery which separates an anode compartment from a cathode compartment of the battery.

3 Claims, 2 Drawing Figures

DOUBLE SEAL FOR SODIUM SULFUR BATTERY

BACKGROUND OF THE INVENTION AND PRIOR ART STATEMENT

The invention herein described was made in the course of or under a contract or subcontract with the Department of Energy.

This invention is directed to a seal for a sodium sulfer battery in which the sealing is accomplished by two radial compression seals located one above the other on a ceramic component of the battery which separates an anode compartment from a cathode compartment of the battery.

A prior art search conducted on the subject matter of this application resulted in the citation of U.S. Pats. Nos. 3,928,071 and 3,939,007. I believe that these patents are not related to the subject matter of this application because they do not show a double radial compression seal located one above the other against a ceramic component of the battery of the nature that is disclosed herein. The U.S. Pat. No. 3,928,071 uses a glass seal 34 to contact the ceramic inner casing 11 and upon reading the rest of this specification one will immediately recognize that it is not analgous or similar in any manner to the seal shown herein.

U.S. Pat. No. 3,939,007 has an alpha alumina flange 8 bonded to an inner tube 1 in a manner which also is not analgous or suggestive of the particular structure herein disclosed, as will be readily apparent upon reading of this specification.

The type of seal structure that I am aware of with respect to the seal structure disclosed in this specification is that seal structure taught in U.S. application Ser. No. 954,967, filed of even date herewith by R. Minck, et al. for SEAL FOR SODIUM SULFER BATTERY. That seal construction proposes radial compressive seals be made on opposite sides of a ceramic element of a sodium sulfur battery. The disclosure also suggests that a single radial seal may be made on one side of the ceramic material and a different type of seal be made on the other side of the ceramic material. That disclosure in no way teaches or suggests a seal construction of the specific type disclosed herein wherein radial seals are made one above the other against the outside diameter of a ceramic tube used to separate an anode compartment of the battery from a cathode compartment of the battery.

SUMMARY OF THE INVENTION

This invention relates to a seal for a sodium sulfur battery and, more particularly, to a specific structure which provides a pair of seals one above the other against a ceramic member which acts as a separator between an anodic compartment and a cathodic compartment of such a battery.

In accordance with the specific teachings of the structure of this invention, an improved seal for sealing two compartments from one another, the two compartments being separated from one another at least in part by a tube of ceramic material of circular cross section which has an inner surface and an outer surface, is made as follows.

A lower can member encircles and is spaced from the outer surface of the ceramic tube. The lower can member has a top portion formed in the shape of a flange having a flat surface extending outwardly from a position closely adjacent the tube's outer surface to an extended position and then upwardly to a terminal position to thereby define a lower circumferential notch adjacent the tube's outer surface.

An upper can member encircles and is spaced from the tube's outer surface. This upper can member has a bottom portion formed in the shape of a flange having a flat surface extending outwardly from a position closely adjacent the tube's outer surface to an extended position and then downwardly to a terminal position to thereby define an upper circumferential notch adjacent the tube's outer surface.

A soft deformable lower ring element is received in the lower circumferential notch. A soft deformable upper ring element is received in the upper circumferential notch.

An electrically insulated, pressure applying element is also provided which has a lower pressure applying surface engaging the lower ring element in the lower circumferential notch and an upper pressure applying surface engaging the upper ring element in the upper circumferential notch. A pressure applying and electrical insulating device is also provided for engaging the flanges formed on the top portion of the lower can member and the bottom portion of the upper can member to apply pressure thereto and to electrically insulate the same. The application of pressure by this device causes the pressure applying element to deform both the lower ring element and the upper ring element in their respective circumferential notches into sealing contact with the tube's outer wall and to electrically insulate the lower can member from the upper can member.

Such a sealing arrangement provides two radial seals, one above the other, against the ceramic tube material and holding flanges of the can members. This allows separation of the battery into two reactant zones, one defined on the inside of the ceramic tube and the interior of the upper can member, and the other being defined between the exterior surface of the ceramic member and the lower can member.

In accordance with the preferred teachings of this invention, the ceramic tube is the electrolyte for the sodium sulfur cell.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in conjunction with the accompanying drawings wherein like reference characters indicate like parts throughout the several Figures, and in which:

DESCRIPTION OF A PREFERRED EMBODIMENT

Figures 1, 2:
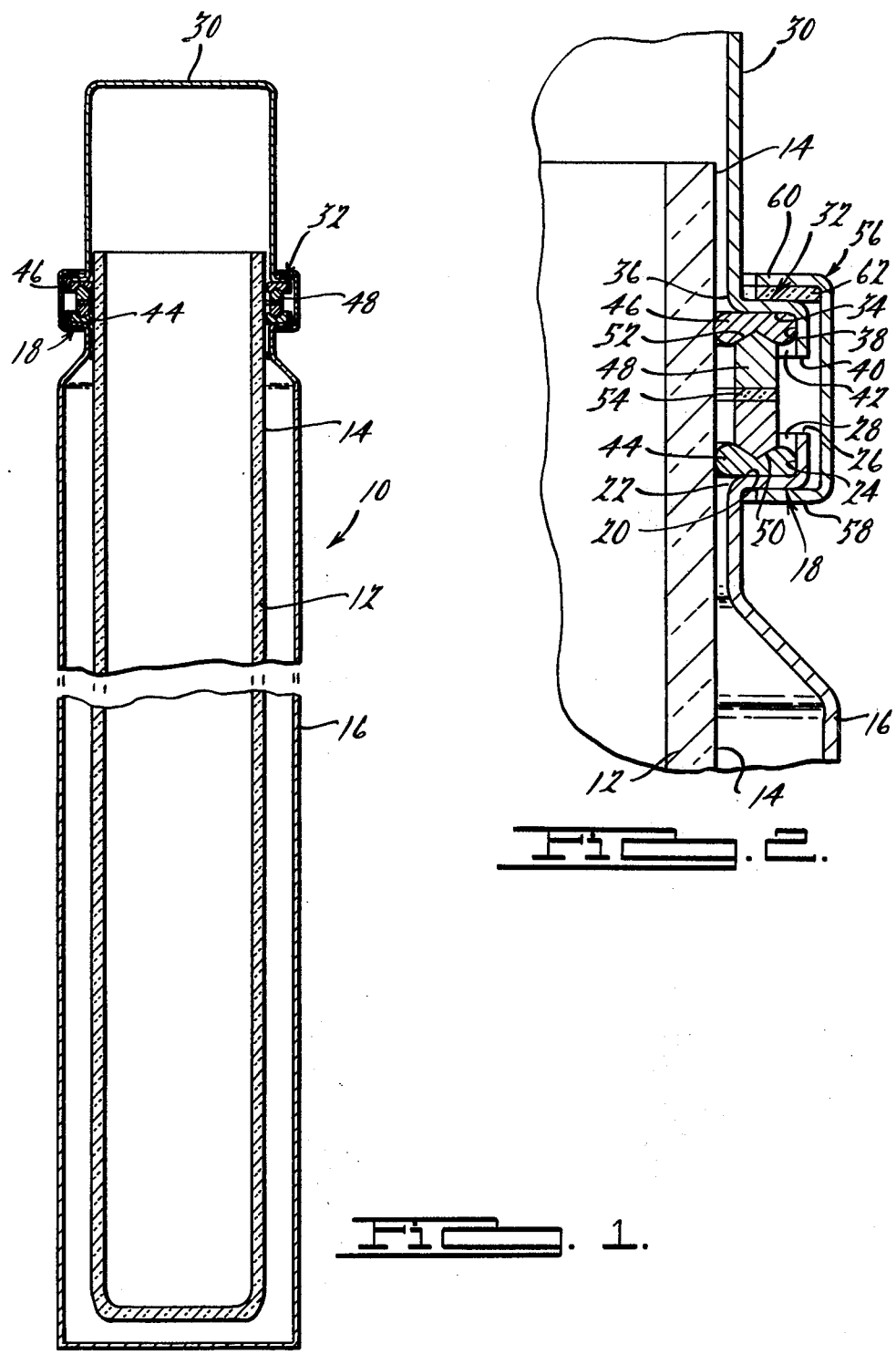
FIG. 1 is an elevation view, in cross section, of a sodium sulfur battery sealed by the seal of my invention.
FIG. 2 is an exploded view of one corner of the battery showing the sealing structure in larger dimensions.

The general principle of operation of a sodium sulfur battery is well known to those skilled in the art as is evidenced by the great number of patents which have been issued in this area. Therefore, no discussion will be undertaken herein of the theory and operation of such a battery.

Those skilled in the art know that it is necessary to seal the anodic compartment of the battery from the cathodic compartment of the battery so that the battery may carry out its intended function. Many different types of seals have been developed as is evidenced by the number of patents which have issued in this area. However, I am unaware of any sealing structures of the specific type disclosed and claimed herein.

Also, for the sake of simplicity, only the general components of a sodium sulfur battery are shown in the drawings. Reference is now made to the drawings.

In FIG. 1 there is seen a sodium sulfur battery generally designated by the numeral 10. This battery has a beta alumina electrolyte, closed end tube 12 of circular cross section. This tube defines the separation between anodic and cathodic compartments of the battery 10. The tube 12 has an outer face 14.

The seal structure of this invention will best be understood by viewing FIG. 2 of the drawings.

A lower can member 16 encircles and is spaced from the outer surface 14 of the tube 12. The lower can member 16 has a top portion generally designated by the numeral 18 formed in the shape of a flange. This flange has a flat surface 20 extending outwardly from a position 22 adjacent the outer surface 14 of the tube 12 to an extended position 24 and then upwardly to a terminal position 26 to thereby define a lower circumferential notch 28 adjacent the outer surface 14 of the tube 12.

In a like manner, an upper can member 30 encircles and is spaced from an upper portion of the outer surface 14 of the tube 12. This upper can member 30 has a bottom portion generally designated by the numeral 32 in the shape of a flange. The bottom portion 32 has a flat surface 34 extending outwardly from a position 36 adjacent the outer surface 14 of the tube 12 to an extended position 38 and then downwardly to a terminal position 40 to thereby define a lower circumferential notch 42 adjacent the outer surface 14 of the tube 12.

A soft deformable lower ring element 44, formed from a metal such as aluminum, is received in the lower circumferential notch 28. In a similar manner, a soft deformable upper ring element 46 is received in the upper circumferential notch 42.

An electrically insulated, pressure applying element 48 has a lower pressure applying surface 50 engaging the lower ring element 44 and an upper pressure applying surface 52 engaging the upper ring element 46. The electrically insulating and pressure applying element 48 has the pressure applying portions thereof made of a hard metallic material with a central electrical insulating material 54 located therebetween.

A pressure applying device, generally designated by the numeral 56, takes the form of a C-shaped cross section metal band which is clamped around the entire circumferential portions of the top portion 18 of the lower can member 16 and the bottom portion 32 of the can member 30 to apply pressure thereon and cause the seals to be formed. A lower leg 58 of the pressure applying device 56 is received under the outwardly extending flat surface 20 of the top portion 18 of the lower can member 16. In a similar manner, an upper leg 60 of the pressure applying device 56 is received over the outwardly extending flat surface 34 of the bottom portion 32 of the upper can member 30. A band of electrical insulating material 62 is positioned between the upper leg 60 and the flat surface 34.

The pressure applying device 56 is clamped onto and formed about the assembly in a manner which generates a clamping pressure between the top portion 18 of the lower can member 16 and the bottom portion 32 of the upper can member 30. This clamping pressure is sufficient so that the lower pressure applying surface 50 and the upper pressure applying surface 52 of the electrically insulated and pressure applying element 48 deforms respectively the lower ring element 44 and the upper ring element 46 in their respective circumferential notches in a manner which causes them to flow into sealing engagement with the outer surface 14 of the tube 12 and their respective circumferential notches. The seals are made one above the other on the outer surface 14 of the tube 12. In that manner, the interior of the tube 12 and the interior of the upper can member 30 define one compartment of the battery, while the volume between the outer surface 14 of the tube 12 and the interior of the lower can member 16 define the other electrode compartment.

The entire battery 10 may be assembled as follows. The lower can member 16 is slipped up over the tube 12 so that the position 22 of the top portion 18 of the lower can member 16 is adjacent the outer surface 14 of the tube 12. The lower ring element 44 is then dropped into the lower circumferential notch 28. The electrically insulated and pressure applying element 48 is then placed on top of the lower ring element 44 followed by positioning of the upper ring element 46 on top of the electrically insulated and pressure applying element 48. The upper can member is then positioned about the tube 12 so that its bottom portion 32 is aligned so that the upper ring element 46 is received in the upper circumferential notch 42. The electrical insulating material 62 is then positioned on top of the flat surface of the bottom portion 32 of the upper can member 30.

Thereafter, the pressure applying device 56 is placed on the assembly to effect the seals. This ring may, for example, be a metal ring which is bent into the shape shown in the drawings after being placed in the illustrated position. As the pressure applying device is clamped into place, pressure is applied on the assembly sufficient to cause deformation of the lower ring element 44 and the upper ring element 46 into sealing engagement with the outer surface 14 of the tube 12 and their respective circumferential notches to produce the seals between the two compartments as previously described.

While a particular embodiment of the invention has been illustrated and described herein, it will be obvious to those skilled in the art that various changes and modifications may be made to the invention without departing from the invention, and it is intended to cover in the appended claims all such modifications and equivalents as fall within the true spirit and scope of this invention.

What is claimed is:

1. In a sodium sulfur battery an improved seal for sealing two compartments from one another, the two compartments being separated from one another at least in part by a tube of ceramic material of circular cross section having an inner surface and an outer surface, said seal comprising:

a lower can member encircling and spaced from the tube's outer surface, said lower can member having a top portion formed in the shape of a flange having a flat surface extending outwardly from a position closely adjacent the tube's outer surface to an extended position and then upwardly to a terminal position to thereby define a lower circumferential notch adjacent the tube's outer surface;

an upper can member encircling and spaced from the tube's outer surface, said upper can member having a bottom portion formed in the shape of a flange having a flat surface extending outwardly from a position closely adjacent the tube's outer surface to an extended position and then downwardly to a terminal position to thereby define a lower circumferential notch adjacent the tube's outer surface;

a soft deformable lower ring element received in said lower circumferential notch;

a soft deformable upper ring element received in said upper circumferential notch;

an electrically insulated, pressure applying element having (a) a lower pressure applying surface engaging said lower ring element in said lower circumferential notch, and (b) an upper pressure applying surface engaging said upper ring element in said upper circumferential notch; and pressure applying and electrical insulating means for engaging said flanges formed on said top portion of said lower can member and said bottom portion of said upper can member to apply pressure thereto and to electrically insulate the same so that said pressure applying element deforms both said lower ring element and said upper ring element in their respective circumferential notches into sealing contact with the tube's outer wall and said circumferential notches and to electrically insulate said lower can member from said upper can member.

2. The seal of claim 1, wherein: the ceramic tube is the electrolyte of the battery.

3. The seal for a sodium sulfur battery as defined in claim 1, wherein said pressure applying and electrical insulating means includes a metal band having an inwardly facing C-shaped cross section in the vertical dimension, a lower leg of the band being received under the outwardly extending flat surface of said top portion of said lower can member and an upper leg of said metal band being received over the outwardly extending flat surface of said bottom portion of said upper can member, said band member being forced into engagement with the surfaces in a manner which applies pressure on said upper and said lower ring elements to deform the same into sealing contact, and an electrical insulating member placed between at least one of the flanges of one of the can members and said metal band.

* * * * *